United States Patent [19]

Deline

[11] 4,409,257
[45] Oct. 11, 1983

[54] HOMOGENEOUS, FREE-FLOWING LIQUID BLACK PEPPER OLEORESIN COMPOSITION

[75] Inventor: G. Duane Deline, Glen Arm, Md.

[73] Assignee: McCormick & Company, Inc., Hunt Valley, Md.

[21] Appl. No.: 381,756

[22] Filed: May 25, 1982

[51] Int. Cl.$^3$ .............................................. A23L 1/221
[52] U.S. Cl. .................................................... 426/651
[58] Field of Search ........................................ 426/651

[56] References Cited

U.S. PATENT DOCUMENTS

| 2,778,738 | 1/1957 | Fagen | 426/651 |
| 3,464,831 | 9/1961 | Ziegler | 426/651 |
| 4,284,657 | 8/1981 | Stanton | 426/651 |

OTHER PUBLICATIONS

Arctandex Perfume and Flavor Chemicals, vols. I–II, 1969, Publ. by the Author; Montclair, N.J., Monograph Nos. 290, 2627.
Wenter Consumer's Dictionary of Food Additives, 1972, Crown Publishers; New York, p. 40.
Pruthi, Spices and Condiments; Chemistry, Microbiology, Technology, 1980, Academic Press; New York, pp. 236–251.

*Primary Examiner*—Joseph M. Golian
*Attorney, Agent, or Firm*—Cushman, Darby & Cushman

[57] ABSTRACT

A homogeneous liquid composition for seasoning, flavoring and coloring foods and beverages is prepared from black pepper oleoresin and benzyl alcohol. The composition can also contain a food-grade emulsifier as well as such adjuvants as oleoresins of herbs and spices other than black pepper, essential oils of herbs and spices and edible coloring materials. The composition is both oil and water dispersible.

8 Claims, No Drawings

HOMOGENEOUS, FREE-FLOWING LIQUID BLACK PEPPER OLEORESIN COMPOSITION

BACKGROUND OF THE INVENTION

The present invention relates to a homogeneous, free-flowing, liquid oleoresin composition consisting essentially of black pepper oleoresin and benzyl alcohol.

Heretofore various attempts have been made to produce a fluidized oleoresin composition, including a black pepper oleoresin composition.

Notably, U.S. Pat. Nos. 2,626,218 and 2,680,690, to Johnstone and Schumm, utilize anhydrous lactic acid to solubilize the piperine in black pepper oleoresin. The piperine component is, of course, the component which is responsible for the "bite" of the pepper and, conventionally, black pepper oleoresin is an extract of pepper produced by extracting the piperine, volatile oils and fixed oils from dried pepper pods by the use of a solvent, such as alcohol, acetone or ethylene dichloride. After extraction, the solvent is removed, as by distillation, and there remains an extract of pepper, conventionally known, as indicated above, as black pepper oleoresin. However, the liquid pepper compositions of Johnstone and Schumm exhibit several major disadvantages. The lactic acid component of these compositions is corrosive in certain canning operations. Moreover, lactic acid is very difficult to maintain in anhydrous conditions. Further, such compositions are thick or viscous and do not always maintain a homogeneous solution after manufacture or during shipping or storage.

Other attempts include a mixture of black pepper oleoresin with propylene glycol, as described in U.S. Pat. No. 2,778,738 to Fagen, while U.S. Pat. No. 2,860,054 to Yanick discloses a solution of black pepper oleoresin which includes an acetate compound such as mono-, di- or tri-acetin, an organic acid such as acetic, levulinic, pyruvic, citric, sorbic or benzoic acid, and ethanol.

In U.S. Pat. No. 3,464,831 to Ziegler there is disclosed a method of making a liquid black pepper extract from a liquid black pepper oleoresin by separating the oleoresin into a liquid oil fraction and a solid fraction by applying a physical force to the oleoresin, such that the said liquid oil fraction contains liquid volatile oil, liquid non-volatile oil and dissolved piperine, and the solid fraction consists essentially of at least 60% by weight piperine. The liquid oil fraction constitutes the liquid pepper extract of the invention.

In U.S. Pat. No. 3,906,116 to Quesnel et al, there is disclosed a method for preparing an aqueous emulsion of pepper oleoresin by forming an oleoresin solution or colloidal solution of the pepper oleoresin in a diluent. There is then admixed with the solution under agitation conditions a preformed mixture of an emulsion stabilizer, at least one of an edible or essential oil and then adding thereto an aqueous solution or dispersion of an emulsion stabilizer to form a final mixture. Thereafter the final mixture is emulsified.

More recently, U.S. Pat. No. 4,284,657 to Stanton describes an aqueous based fluidized oleoresin composition which contains 10 to 20 percent by weight of a natural oleoresin, from about 10 to 20 percent by weight of a surfactant, from about 0.25 to 2 percent by weight of an edible hydrophilic gum, from about 0.025 to 1 percent by weight of phosphoric acid and at least about 60% by weight of water. A primary disadvantage of this composition is the high water content thereof. The composition has to be preserved against microbial growth and has been found to have a shorter shelf-life than a water-free composition. Further, such aqueous based compositions are more expensive to ship than concentrated, water-free formulations. Moreover, the piperine component in these compositions is present in crystalline form and requires dissolution, with heat and/or agitation, in the finished food product. To be completely utilized by human taste buds the piperine must be completely dissolved in the ultimate food to which it has been added.

Another recent patent, i.e. U.S. Pat. No. 4,285,981 to Todd et al discloses a homogeneous liquid condimental composition which is dispersible in both oil and water, and consists essentially of lecithin, tartaric esters of mono- and diglycerides and, in one embodiment oleoresin black pepper.

Many of the previously known oleoresin compositions suffer from one or more disadvantages, as noted above. Accordingly, an object of the present invention is the provision of an improved homogeneous, free-flowing liquid black pepper oleoresin composition which overcomes these disadvantages.

Thus, the composition of the present invention exhibits, inter alia, improved flowability, homogeneity, solubility and high oleoresin concentration characteristics.

While currently available or commercial black pepper oleoresin compositions are quite viscous, often paste-like, and are difficult to weigh, handle and transfer, the black pepper oleoresin composition of the present invention is a free-flowing liquid that can be easily poured or pumped from one container to another with minimum waste. As is known black pepper oleoresin is expensive so that minimizing losses during handling represents a significant economical advantage.

Further, typical known black pepper oleoresin is composed of a crystalline material, i.e. piperine, suspended in the fixed and volatile oils found naturally in this spice. The practice of the present invention converts the oleoresin black pepper into a completely homogeneous liquid, the piperine content of which is totally or completely dissolved. Thus, the composition of the present invention experiences no "recrystallization" of the piperine, even when placed in cold storage and seeded with piperine crystals.

By varying the ratios of (1) oleoresin black pepper, (2) benzyl alcohol and (3) food grade emulsifiers and/or diluents, the oleoresin composition of the present invention can be oil-soluble or water-dispersible without heating the composition. For example, the oil-soluble black pepper oleoresin composition of the present invention is miscible, at all concentrations, in such vegetable oils as cottonseed oil, corn oil, soy oil, peanut oil and fractionated coconut oil. The composition of the present invention can also be provided in water dispersible form by the addition thereto of effective amounts of a food grade emulsifier. Since the piperine component is dissolved, it is completely dispersible in the food or beverage in which it is ultimately incorporated.

A further advantage of the present invention resides in the increased piperine content thereof compared with conventional oleoresin black pepper compositions. The piperine content is commonly measured by a spectrophotometric procedure, as disclosed for instance in Food Chemical Code, 3rd Ed., 1981, p. 527. The significantly higher piperine content achieved in accordance with the present invention represents an important advantage over previously known solubilized pepper formulations.

The black pepper oleoresin component employed in the present invention can be a standard oleoresin product of commerce and can be provided in accordance with conventional methods of preparation. For example, in preparing a black pepper oleoresin product, black pepper corns can be ground and mixed with a solvent such as acetone, although other conventional solvents can be employed. The oleoresin can be extracted using conventional extraction techniques and equipment. On completion of the oleoresin extraction stage, the insolubles including cellulosic materials, starches and sugars are removed and the solvent is subsequently eliminated so as to provide a black pepper oleoresin material comprising piperine and volatile and fixed oils.

Representative food grade emulsifiers employed in the present invention include polyoxyethylene ethers of sorbitol monooleate having about 20 oxyethylene groups per molecule, tartaric acid esters of mono- and diglycerides, and polyglycerol fatty acid esters. Specifically such food grade emulsifiers include diacetyl tartaric acid ester of monoglycerides, sorbitan monooleate and trioleate, triglycerol monostearate, triglycerol monooleate, octaglycerol monooleate, octaglycerol monostearate and decaglycerol monocaprylate-caproate. Representative diluents employed in the invention include vegetable oils, propylene glycol, ethyl alcohol, tetrahydrofurfuryl alcohol, triethyl citrate, glycerol triacetate, dibenzyl ether, and glycerine.

The homogeneous, free-flowing, liquid oleoresin composition of the present invention consists essentially of 20 to 60 weight percent black pepper oleoresin, 20 to 50 weight percent benzyl alcohol and 0 to 50 weight percent food grade emulsifier.

Preferably, the ratios of (1) black pepper oleoresin (2) benzyl alcohol and (3) food grade emulsifiers and/or diluents are as follows: 50:30:20 to 20:40:40, respectively.

Further when an adjuvant such as one or more of an oleoresin other than black pepper oleoresin, or essential oils or edible food colorings are included, the adjuvant can be present in an amount up to about 60 weight percent of the total weight of the composition of the present invention.

As indicated above, the liquid black pepper oleoresin composition of the present invention can also contain other oleoresins which can conventionally be prepared from the appropriate natural plant tissues containing the same by solvent extraction, followed by solvent removal. Representative other oleoresin materials include oleoresins of allspice, anise, basil, capiscum, caraway, cardamon, celery, cinnamon, clove, coriander, cubeb, cumin, dill seed, fennel, garlic, ginger, laurel leaf, mace, marjoram, nutmeg, mustard, onion, origanum, paprika, rosemary, sage, tarragon, thyme, turmeric and vanilla, alone or in any desired combination.

Additionally, the essential oils, i.e. the volatile oils obtained from plants (spices and herbs) can also be employed in the homogeneous, free-flowing liquid black pepper oleoresin composition of the present invention. These oils usually have the characteristic odor and flavor of the spice or herb and are most often steam distilled therefrom. Representative useful essential oils include those of marjoram, nutmeg, rosemary and thyme as well as any of those herbs and spices listed above with regard to useful other oleoresins.

Moreover, the composition of the present invention can contain edible coloring material which is ingestible or orally acceptable such as oleoresin paprika, synthetic capsanthin, lycopene or beta-apo-8 carotenal. Those skilled in the art will clearly recognize other useful edible coloring materials.

The composition of the present invention can be employed in flavoring foods including solid or liquid foods and beverages such as tomato juice, vegetable juice and other drinkables or chewables.

The homogeneous, free-flowing, liquid composition of the present invention can be provided in microencapsulated form by, for instance, spray drying in the presence of an encapsulent material complying with relevant food regulations. Suitable encapsulants include such polymeric materials as natural or modified gums including gum acacia, natural or modified starch, such as dextrinized starch, a dextrin or maltodextrin, a pectin, an alginate, or a proteinaceous material such as gelatin or casein.

Additionally, the homogeneous free-flowing liquid composition can be provided in the form of a dry-blend dispersed on food-grade diluents or substrates such as salt, dextrose, sugar, flour, texturized vegetable protein, whey and the like. Conventional dry-blending procedures can be employed to produce such forms of the composition of the present invention.

The following non-limiting examples illustrate the present invention. Unless otherwise stated, all parts and percentages are by weight.

EXAMPLE 1

A composition according to the present invention is prepared by admixing 50 parts by weight black pepper oleoresin and 50 parts by weight benzyl alcohol until all the piperine crystals of the oleoresin component are dissolved.

The resulting composition remains homogeneous even when refrigerated for several months, no piperine crystal separation being observed. This free-flowing liquid composition is miscible, without heat, in all proportions with vegetable oils, other oleoresins, essential oils, and food-grade emulsifiers.

EXAMPLE 2

A composition according to the present invention is prepared by admixing 30 parts by weight black pepper oleoresin and 30 parts by weight benzyl alcohol until all the piperine crystals of the black pepper oleoresin component are dissolved. Thereafter 40 parts by weight of, as a food-grade emulsifier, tartaric acid esters of mono- and di-glycerides are added thereto.

The resulting free-flowing liquid is dispersible, with agitation, in water.

EXAMPLE 3

A composition according to the present invention is prepared by admixing 30 parts by weight black pepper oleoresin and 30 parts by weight benzyl alcohol until the piperine crystals of the black pepper oleoresin are completely dissolved.

To the resulting homogeneous admixture there are added 40 parts by weight of a seasoning blend containing the oleoresins of celery, cinnamon, marjoram, sage, clove and mace, together with essential oils of marjoram, rosemary, nutmeg and thyme.

The resulting composition remains a free-flowing homogeneous product with no piperine re-crystallization being observed even after several weeks storage at room temperature.

EXAMPLE 4

A composition according to the present invention is prepared by admixing 30 parts by weight black pepper oleoresin, 30 parts by weight benzyl alcohol, 30 parts by weight polyoxyethylene sorbitan monooleate containing 20 oxyethylene units per molecule thereof and 10 parts by weight of polyglycerol fatty acid esters until all the piperine crystals of the black pepper oleoresin component are dissolved. The resulting free-flowing homogeneous liquid product is both oil and water dispersible.

EXAMPLE 5

A composition in accordance with the present invention is prepared by admixing 20 parts by weight black pepper oleoresin and 25 parts by weight benzyl alcohol until all the piperine crystals of the black pepper oleoresin component are dissolved.

To the resulting homogeneous admixture there are added 25 parts by weight fractionated coconut oil and 30 parts by weight of a seasoning blend containing celery oleoresin, turmeric oleoresin, paprika extract, oil of rosemary, oil of marjoram and thyme oleoresin.

The resulting free flowing-liquid is then dry-blended on a dry carrier such as salt.

In another embodiment of the present invention the above free-flowing liquid is emulsified with a food-grade emulsifier and spray dried to provide a dry chicken soup seasoning product.

What is claimed is:

1. A homogeneous, free-flowing, liquid oleoresin composition consisting essentially of 20 to 60 weight percent black pepper oleoresin, 20 to 50 weight percent benzyl alcohol and 0 to 50 weight percent food grade emulsifiers and/or diluents.

2. The homogeneous, free-flowing, liquid oleoresin composition of claim 1 which also includes an effective amount of one or more of a natural oleoresin other than black pepper oleoresin, essential oils, edible coloring material, natural flavors, or artificial flavors.

3. A method for producing a homogeneous, free-flowing, liquid oleoresin composition comprising the steps of admixing 20 to 60 parts by weight of black pepper oleoresin with 20 to 50 parts by weight benzyl alcohol, and thereafter blending with the resulting admixture 0 to 50 parts by weight of a food grade emulsifier.

4. The method of claim 3 which also includes spray-drying said homogeneous, free-flowing liquid oleoresin composition.

5. The method of claim 3 which also includes encapsulating said homogeneous, free-flowing liquid oleoresin composition.

6. The method of claim 3 which also includes dispersing said homogeneous, free-flowing liquid composition on a food-grade diluent.

7. The method of claim 6 wherein said homogeneous, free-flowing liquid is dry-blended with said food-grade diluent so as to produce said dispersion.

8. The method of claim 7 wherein said food-grade diluent is salt, dextrose, sugar, flour, texturized vegetable protein or whey.

* * * * *